United States Patent [19]
Foley et al.

[11] Patent Number: 4,635,739
[45] Date of Patent: Jan. 13, 1987

[54] PAYLOAD MONITOR

[75] Inventors: Donald E. Foley, Peoria Heights; Gregory H. Gipp, Peoria; William G. Schwader, East Peoria; Craig L. Sells, Peoria; James A. Smittkamp, Peoria; Alan L. Stahl, Peoria; John F. Szentes, Peoria, all of Ill.

[73] Assignee: Caterpillar Inc., Peoria, Ill.

[21] Appl. No.: 749,607

[22] Filed: Jun. 25, 1985

[51] Int. Cl.[4] ............... G01G 23/18; G01G 19/10; G01G 5/04
[52] U.S. Cl. ............... 177/45; 177/141; 177/208
[58] Field of Search ............... 177/45, 46, 141, 208

[56] References Cited

U.S. PATENT DOCUMENTS

| 3,310,976 | 3/1967 | Bussell et al. | 73/65 |
| 4,007,894 | 2/1977 | Hartel | 244/104 |
| 4,230,196 | 10/1980 | Snead | 177/141 |
| 4,456,084 | 6/1984 | Miller | 177/141 |
| 4,511,974 | 4/1985 | Nakane et al. | 364/463 |

FOREIGN PATENT DOCUMENTS

| 1458324 | 10/1966 | France |
| 2428245 | 1/1980 | France |
| 2136141 | 9/1984 | United Kingdom |

*Primary Examiner*—George H. Miller, Jr.
*Attorney, Agent, or Firm*—Terry D. Morgan

[57] ABSTRACT

An apparatus determines the payload carried in a work vehicle by periodically measuring the pressure of a fluid contained within front and rear suspension struts. The struts are connected in supporting relation between a load carrying portion and a ground engaging portion of the vehicle such that a pressure differential between a loaded and unloaded vehicle can be shown to be indicative of the magnitude of the payload. Moreover, the pressures are a function of the geometry of a suspension means which interconnects the load carrying portion and the ground engaging portion.

13 Claims, 6 Drawing Figures

FIG_3A.

Fig_3B_

PAYLOAD MONITOR

DESCRIPTION

1. Technical Field

This invention relates generally to an apparatus for accurately determining the payload carried by a work vehicle, and more particularly, to an apparatus which correlates suspension strut pressures and suspension geometry into an accurate indication of work vehicle payload.

2. Background Art

In the field of off-highway trucks used, for example, in mining operations, it is desirable that an accurate record be kept of the quantity of material removed from the mining site. This information can be used to calculate mine and truck productivity as well as aid in forecasting profitability and work schedules.

Previously, mine operators have been forced to use traditional fixed scales to obtain the accuracy considered necessary to make the payload information useful. The fixed scales are typically located along the truck haul route such that a minimum amount of time is expended in weighing the trucks. However, as the mining operation progresses, the truck haul routes will necessarily be altered which results in a major capital expenditure of periodically relocating the fixed scales to more advantageous locations. Further, while the truck is being weighed, it cannot be performing useful work, and thus, the weighing operation intended to measure truck productivity is a negative influence on truck productivity. An alternate method for determining mine productivity simply involves establishing a standard payload and applying this standard to the number of completed truck loads. Obviously, this method reduces unproductive truck time, but the resultant inaccuracy is significant. It is desirable to have a weighing scheme which is route independent and yet accurate.

Prior on board payload weighing apparatus are notoriously inaccurate under actual loading conditions. Heretofore, these on board systems have relied upon calibration without consideration to the effects of load distribution caused by material placement and unlevel loading conditions. It would be advantageous for an on board payload monitor to accurately detect load substantially independent of load position and underfoot conditions. An important benefit to accurate payload monitoring is that the possibility of overloading a truck is greatly reduced and; consequently, extreme tire wear normally associated with overloaded trucks is minimized.

Further, in prior monitoring systems actual recording of a completed loading cycle is a process normally delegated to the vehicle operator. The interaction between the monitor and the operator is typically of a simple nature requiring the operator to push a button and cause the monitor to record the current weight as a valid payload. The possibility of error is introduced by this system through inadvertent or deliberate multiple recordings or conversely missed recordings. It would be advantageous for an on board payload monitor to automatically record each completed loading cycle. Preferably, the monitor would be capable of automatically recording each loading cycle without benefit of additional sensors.

The present invention is directed to overcoming one or more of the problems as set forth above.

DISCLOSURE OF THE INVENTION

In accordance with one aspect of the present invention, an apparatus measures and indicates the weight of a payload carried by a work vehicle. The work vehicle has at least one front and rear strut disposed in supporting relation to a load carrying portion of the work vehicle. A means separately senses the pressures of the front and rear struts and delivers signals respectively responsive to the magnitude of the front and rear strut pressures. A means modifies the front and rear strut pressure signals by applying respective unique correction factors thereto, summing the resultant modified signals, and delivering a control signal responsive to the magnitude of the sum of the modified signals. A means receives the control signal and delivers an indication of the magnitude of the work vehicle payload in response to the magnitude of the control signal.

Prior payload monitors have systematically ignored the effects of load distribution caused by material placement and underfoot conditions. These prior monitors are typically inaccurate under less than ideal conditions such as loading on a grade or loading with a wheel racked. The present apparatus compensates for these inaccuracies without the need for additional sensors.

BEST MODE FOR CARRYING OUT THE INVENTION

Figure 1:
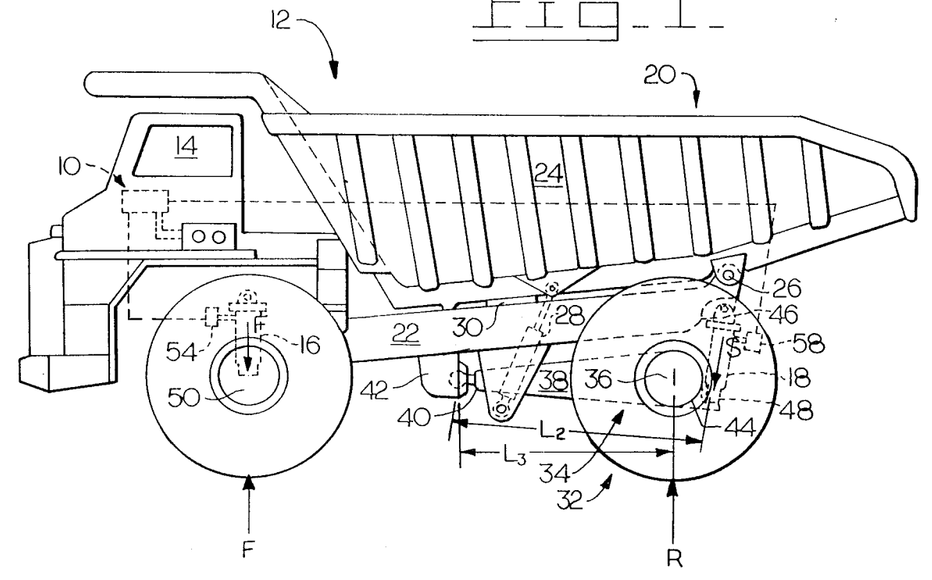
FIG. 1 illustrates a diagrammatic view of an off-highway truck and the location of critical suspension components.

Referring now to the drawings, wherein a preferred embodiment of the present apparatus 10 is shown, FIG. 1 illustrates a work vehicle 12 which can be, for example, an off-highway truck 14. The truck has at least one front and rear strut 16,18 disposed in supporting relation to a load carrying portion 20 of the work vehicle. The preferred embodiment has two front and two rear struts 16,18 which are the gas-over-liquid type commonly known in the industry and not described herein. It is sufficient in the understanding of the instant apparatus to recognize that the pressure of the fluid is indicative of the magnitude of the load applied to the strut 16,18. The load carrying portion 20 includes a vehicular frame 22 and a dump body 24. The dump body 24 is connected to the frame 22 by pivot pin 26 and hydraulic cylinder 28 such that the contents of the dump body 24 can be removed by controllably pressurizing the cylinder 28 to effect pivotal movement of the dump body 24 about the pivot pin 26. In the transport mode the cylinder 28 is not pressurized and the weight of the dump body is transferred to the frame through the pivot pin 26 and a support pad 30 fixed to the frame 22.

The work vehicle 12 further includes a ground engaging portion 32 and a suspension means 34 for supporting said load carrying portion 20 in a manner to provide damped oscillatory motion between the ground engaging portion 32 and the load carrying portion 20. The suspension means 34 includes a rear axle housing 36 and an A-frame moment arm 38. The A-frame moment arm 38 has a first end portion 40 pivotally connected to the vehicular frame 22 by a socket 42 and a second end portion 44 fixedly connected to the rear axle housing 36. The first end portion 40 of the A-frame moment arm 38 is a king bolt arrangement, substantially spherical in shape and retained from lateral movement by the socket 42. The rear strut 18 has a first end portion 46 pivotally connected to the vehicular frame 22 and a second end portion 48 pivotally connected to the second end portion 44 of the A-frame moment arm 38.

During loading of the truck, as the payload increases, the load carrying portion 20 will be displaced in a direction toward the ground engaging portion 32. The rear strut 18 begins to collapse while the A-frame moment arm 38 pivots about first end portion 40. A distance L2 is defined to be the distance between the first end portion 40 pivot point and the second end portion 44 pivot point of the arm 38. Therefore, it can be shown that the rear strut pressure differential is a function of the suspension means 34. Moreover, the rear strut pressure differential can be related to the reaction force R between a work surface and the ground engaging portion 32. A force S experienced by the rear strut 18 can be determined by measuring the internal pressure of the strut 18, subtracting the rear strut pressure corresponding to an unloaded truck, and multiplying the differential pressure by the area of the strut 18. The reaction force R is proportional to the payload of the vehicle 12 and can be assumed to act through the center of the rear axle housing 36 such that a summation of the moments about the pivot point of the king bolt would derive the following equation:

$$R = S*L2/L3 \qquad (eqn. 1.1)$$

where the horizontal distance between the first end portion 40 pivot point and the center of the rear axle housing 36 is defined to be L3.

Similarly, the front strut 16 will be compressed as the load increases; however, the front strut is connected directly between the frame 22 and a front axle housing 50. A more straightforward relationship exists here in that a force F experienced by the front strut 16 can be determined by measuring the internal pressure of the strut 16, subtracting the front strut pressure corresponding to an unloaded truck, and multiplying the pressure by the area of the strut 16. The reaction force F between the ground engaging portion 32 and the work surface is substantially equivalent to the force F experienced by the front strut 16.

Figure 2:
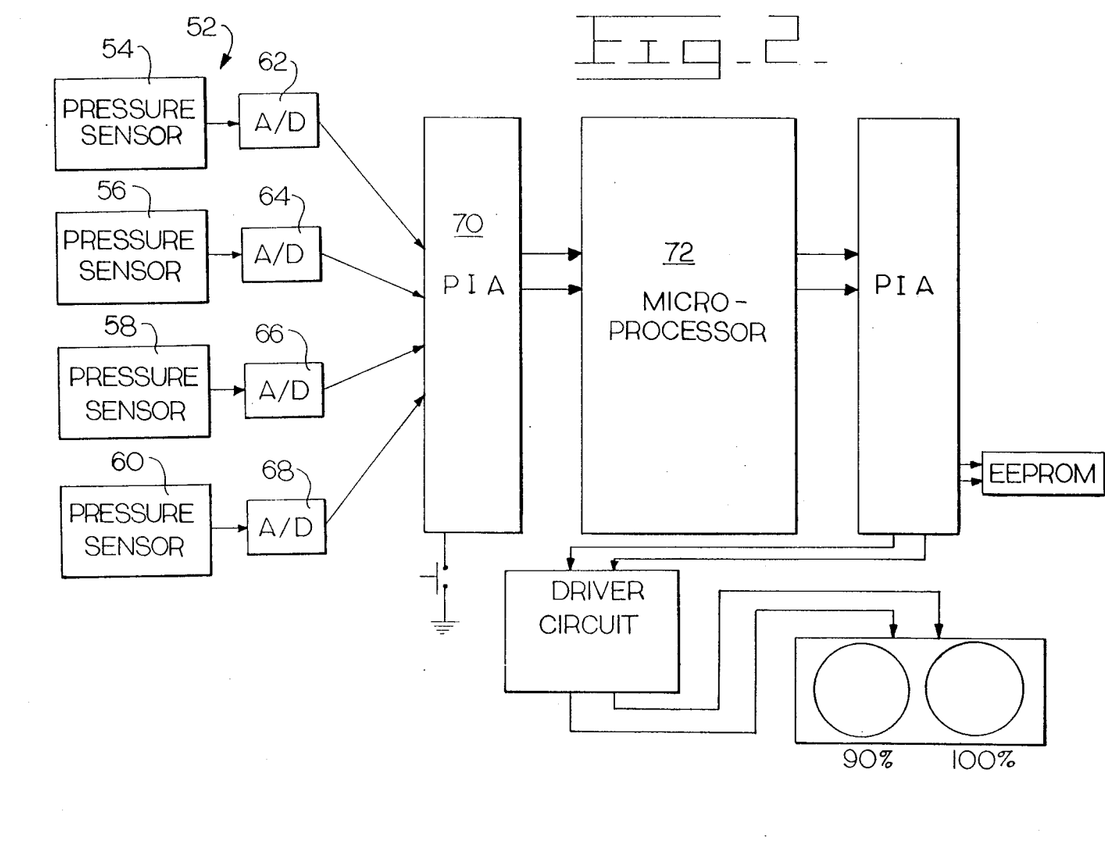
FIG. 2 illustrates a block diagram of the payload monitor.

The apparatus 10 is shown in FIG. 1 to illustrate the relationship between the work vehicle 12 and the location of the apparatus 10. A more detailed block diagram of the apparatus 10 is shown in FIG. 2 and diagrammatically illustrates a means 52 which separately senses the pressures of the front and rear struts 16,18 and delivers signals respectively responsive to the magnitude of the front and rear strut pressures. The means 52 includes a plurality of pressure sensors 54,56,58,60 of the type commercially available from Dynisco as part number PT306. The pressure sensors 54,56,58,60 are respectively associated with the two front struts 16 and the two rear struts 18. Each of the pressure sensors 54,56,58,60 delivers an analog signal proportional to the magnitude of the pressure of the respective strut 16,18 to respective analog to digital converters (A/D) 62,64,66,68. The A/D's 62,64,66,68 can be of the type commercially available from Analog Devices as part number AD574A. Other types of A/D converters have been contemplated by the inventor and the choice of the particular A/D disclosed herein is simply a matter of designer discretion. The selection of a device which provides an analog to frequency output is particularly well suited to the digital microprocessor environment disclosed herein; however, other similar devices could be easily substituted without departing from the spirit of the invention.

A Motorola programmable interface array (PIA) 70 receives the digital frequencies output by the A/D converters 62,64,66,68 and delivers these signals to a microprocessor 72 under software control. In the preferred embodiment, the microprocessor 72 is part number 6809 provided by the Motorola Corp. The microprocessor 72 is programmed to have a means which modifies the front and rear strut pressure signals by applying respective unique correction factors thereto, summing the resultant modified signals, and delivering a control signal responsive to the magnitude of the sum of said modified signals. More specifically, the correction factor of the rear pressure signal is a function of the suspension means 34. Preferably, the rear strut pressure correction factor is a function of the length of the A-frame moment arm 38 and the horizontal distance between the center of the rear axle housing 36 and the first end portion 40 of the A-frame moment arm 38. The rear strut pressure correction factor includes L3/L2.

The apparatus also includes a means 74 which receives the control signal and delivers an indication of the magnitude of the work vehicle payload in response to the magnitude of the control signal. The indicating means 74 has a first means 76 which delivers a first signal in response to the magnitude of the control signal being greater than a first preselected magnitude and a second means which delivers a second signal in response to the magnitude of the control signal being greater than a second preselected magnitude. The indicating means 74 includes a second PIA 78 connected through a driver circuit 80 to a pair of individually energizable incandescent lamps 82,84. The indicating means 74 also includes a portion of the software program of the microprocessor 72 which is disclosed in greater detail in conjunction with the flowchart of FIG. 3d.

Figure 3A:
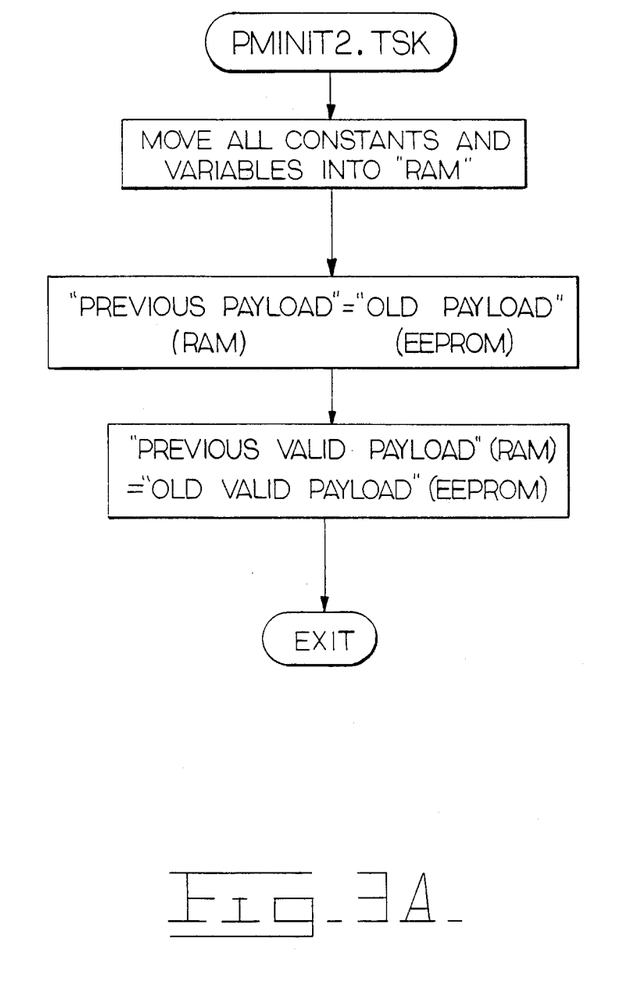
FIG. 3a illustrates a portion of one embodiment of the software flowchart for implementing the payload monitor.

FIG. 3a shows a flowchart representation of PMI-NIT2 TSK program which is an initialization routine performed only during power up of the payload monitor. The initialization routine is responsible to move all constants and variables resident in memory into working RAM. The variables "OLD PAYLOAD" and "OLD VALID PAYLOAD" are also respectively moved from EEPROM into the RAM variables "PREVIOUS PAYLOAD" and "PREVIOUS VALID PAYLOAD".

Figure 3B:
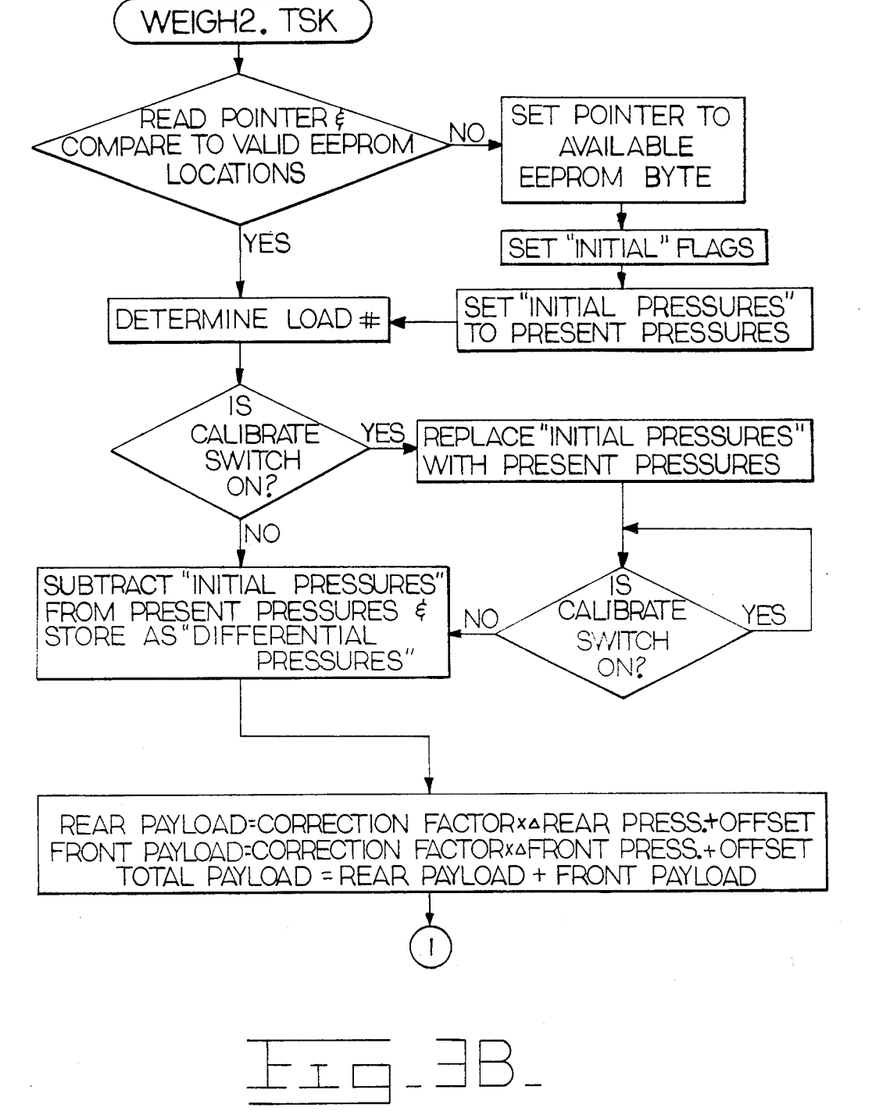
FIG. 3b illustrates a portion of one embodiment of the software flowchart for implementing the payload monitor.

The WEIGH2 TSK program is illustrated via flowchart beginning in FIG. 3b and is primarily configured to calculate the current total payload, determine if the calculated payload is correct, and record only those calculated payloads which reflect a completed loading process. The program begins by checking to determine if a new EEPROM has been placed in the apparatus. The EEPROM is used to store the value of each actual valid payload without the need for continuously powering the memory, and as is well-known in the art, the EEPROM may only be written to a limited number of times which necessitates the need to periodically replace the EEPROM. A memory address pointer is read and compared to the highest valid memory location. If the pointer is indicating a memory location greater than the highest valid memory, then the program assumes that all of the usable memory locations have been accessed. The pointer is subsequently reset to the first valid memory location and the initial flag is set. Further, the last reading of the pressure sensors 54,56,58,60 is stored as the "INITIAL PRESSURE" variables and the variable "LOAD #" is incremented. Should the pointer indicate a valid memory location, then control passes directly to increment the variable "LOAD #" which is merely a sequential indication of each of the completed loads.

The software routine then checks to determine if the calibration switch 86 has been actuated. The operator will typically actuate the calibrate switch 86 at the beginning of a shift when the vehicle is known to be empty. When the calibrate switch is actuated, the variables "INITIAL PRESSURE" are replaced with the last reading of the pressure sensors if the pressures are within a preselected acceptable range. Thus, "INITIAL PRESSURE" contains the value of the pressure signals for an unloaded truck. The program pauses until the calibration switch 86 has been released, at which point the program calculates the payload by computing the pressure differential between "INITIAL PRESSURE" and the last reading of the pressure signals. If the truck is empty, then the pressure differential will be zero and, consequently, the payload will not have changed from the callibration reading. The pressure differential and the calculated payload will remain unchanged until such time as the truck begins to receive material. The actual total payload is calculated from a series of three equations where the front and rear payload components are determined separately and then summed to determine total payload. The correction factors illustrated herein are L3/L2 * strut area for the rear payload and simply strut area for the front payload. Additionally, offsets have been added to both the front and rear payloads to compensate for offsets introduced by friction in the struts 16,18.

Figure 3C:
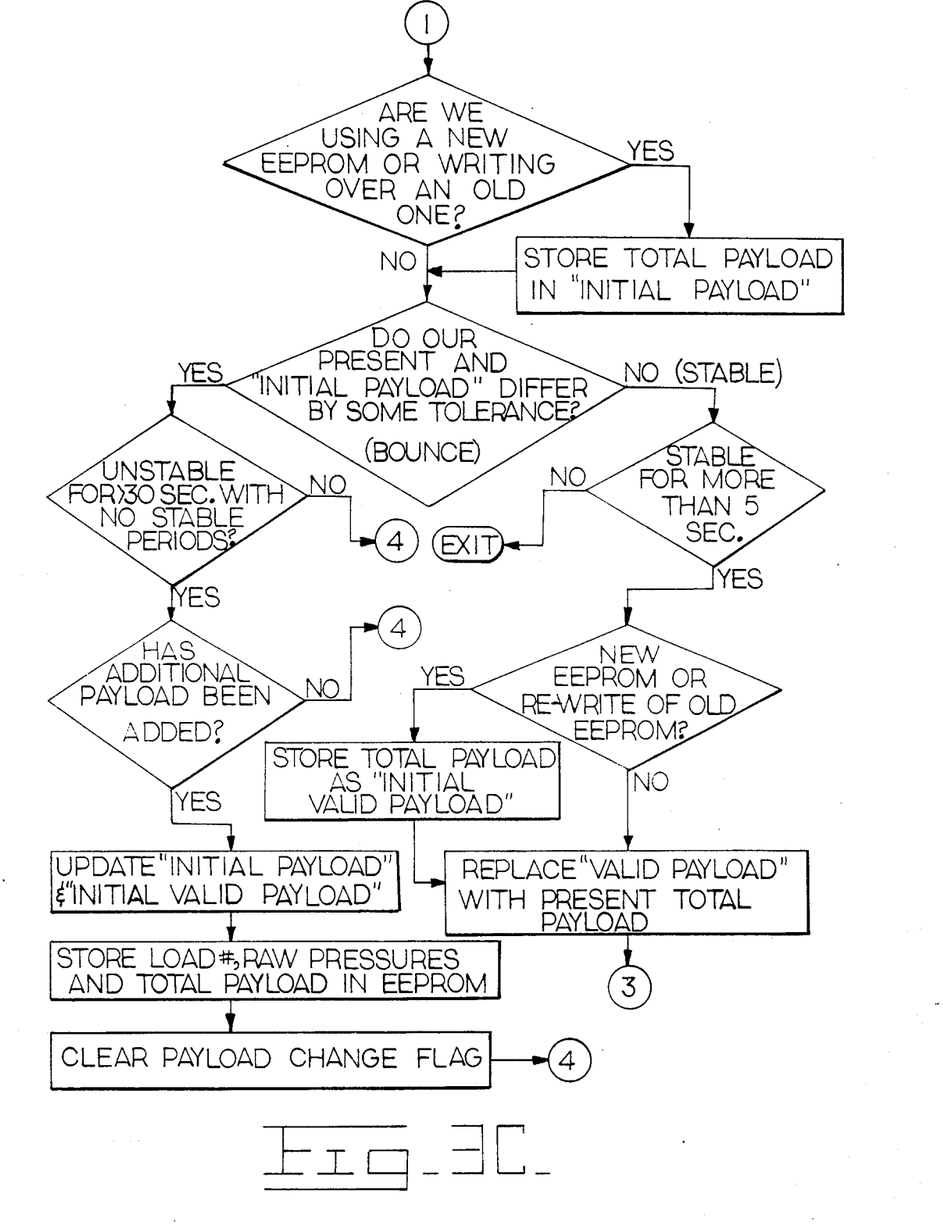
FIG. 3c illustrates a portion of one embodiment of the software flowchart for implementing the payload monitor.
Figure 3D:
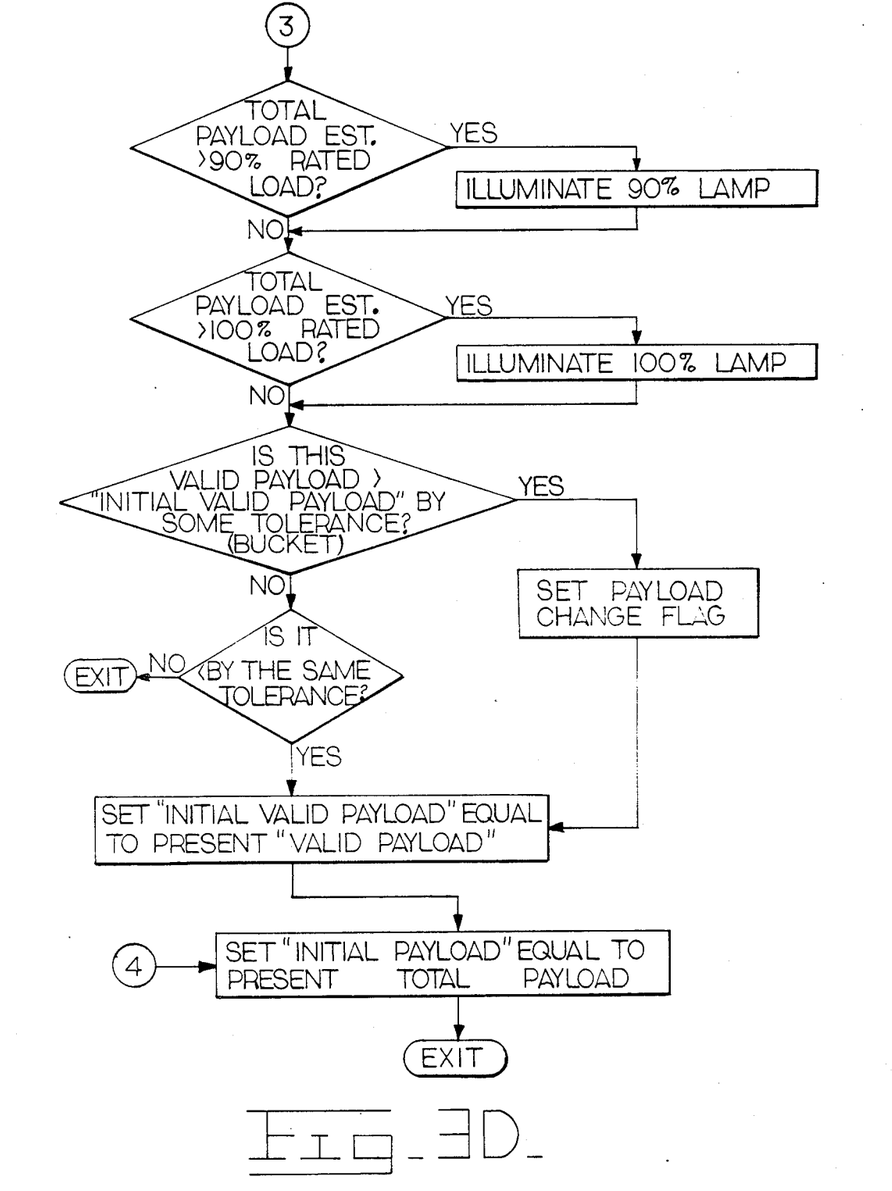
FIG. 3d illustrates a portion of one embodiment of the software flowchart for implementing the payload monitor.

The flowchart of FIG. 3c illustrates a method for determining the validity of the computed total payload. The computed total payload is recorded as an indication of actual current payload in response to the magnitude of the computed payload changing by less than a preselected magnitude during a first preselected duration of time. The program once again checks the status of the memory and if the EEPROM is new, the program stores the computed total payload as the variable "INITIAL PAYLOAD". This process is performed during only the first iteration of the program after a new EEPROM has been loaded because there is no meaningful value stored in the variable "INITIAL PAYLOAD". After the first iteration, the "INITIAL PAYLOAD" is always the previous computed total payload. The computed total payload is compared to "INITIAL PAYLOAD" for an indication that the payload has not changed since the last pressure reading was taken. More specifically, the truck is now in a stable period and there is, therefor, an assumption of validity as to the value of the total payload. The program then monitors the pressure signal for a period of 5 seconds to ensure that the total payload was computed using pressure signals taken during a stable period. Should the pressure signals change by greater than a preselected tolerance, then the program exits to the beginning of the WEIGH2 TSK in an attempt to record only a total payload which was computed from pressure readings taken during a stable period either between individual bucket loads or at the completion of the loading cycle and prior to roading. The status of the EEPROM is checked again to avoid recording the first iteration pressure readings as an indication of the completion of an actual loading operation. If the EEPROM is new, then the computed total payload is stored as the variable "INITIAL VALID PAYLOAD". Subsequently, for either a new or an old EEPROM, the computed total payload is stored as the variable "VALID PAYLOAD".

Program control proceeds to the section of the software which controls the queing lights for a loading vehicle operator (see FIG. 4d). The total payload is compared to 90% of the rated load and the 90% lamp is illuminated to indicate to the operator of a loading vehicle that the truck has been filled to at least 90% of capacity. Similarly, the 100% lamp is illuminated in response to the total payload reaching at least 100% of capacity. Use of the queing lights enables the loader operator to accurately fill the truck within a prescribed tolerance of rated load.

The software is capable of determining the status of the truck relative to the three conditions of loading, dumping, or roading. The "VALID PAYLOAD" is compared to the "INITIAL VALID PAYLOAD" to determine if the payload has been increased by a bucket load, dumped by the truck operator, or no change has occurred since the last pressure reading was taken. If "VALID PAYLOAD" is greater than "INITIAL VALID PAYLOAD" by a preselected tolerance, then the program assumes that an additional bucket load of material has been added to the truck and the "PAYLOAD CHANGE FLAG" is set. Changes within the prescribed tolerance are considered to be inconsequential and can be ignored. Detecting a dumping condition involves determining if the "VALID PAYLOAD" is less than the "INITIAL VALID PAYLOAD" by the same prescribed tolerance. If neither loading nor dumping is detected, then control transfers to the beginning of the WEIGH2 TSK and the process repeats. Either dumping or loading results in "VALID PAYLOAD" being stored as "INITIAL VALID PAYLOAD", and "INITIAL PAYLOAD" being set to the value of the total payload after which control also transfers to the beginning of WEIGH2 TSK. Both of these transfers place the most recent accurate value of actual payload in both "INITIAL VALID PAYLOAD" and "INITIAL PAYLOAD" to ensure that the next iteration of the software routine compares the next computed total payload to the last known accurate payload.

Referring now to the ability of the software routine to detect roading of the truck, the actual portion of the program designed to detect roading is illustrated in FIG. 3c. The routine begins where a decision on the strut pressure stability of the vehicle is made and proceeds in response to the vehicle strut pressure being unstable. At this point, the variable "VALID PAYLOAD" contains a value which is guaranteed to be an actual payload measurement taken during a stable pressure period of the loading operation. The control does not "know" if the value in "VALID PAYLOAD" is representative of a completed loading cycle or is an interim value taken between bucket loads. The software includes a means which stores the magnitude of the actual current payload as a completed loading cycle in response to the absence of the computed total payload being recorded as an actual indication of current payload for a second preselected duration of time. In the preferred embodiment, the second duration of time is selected to be approximately 30 seconds. Thus, the routine monitors the total payload to determine if the strut pressure is unstable for at least 30 seconds with no stable pressure periods of at least 5 seconds. Specifically, this is accomplished by a software counter which increments toward a target value representative of the 30 second interval. The routine which determines 5 seconds of pressure stability is running simultaneously and acts to reset the software counter each time a 5 second period of pressure stability is detected. Consequently, the software counter will only reach the target value if there are no 5 second periods of pressure stability within a 30 second interval. An extended period of pressure instability is assumed to indicate a roading condition, for example, after the vehicle is loaded the operator typically drives the truck to a dump site which will result in unstable pressure readings due to the shock absorbing action of the struts 16,18 over the work surface. The presence of roading is used to indicate that the 30 loading process is completed and the present value of "VALID PAYLOAD" is indicative of the actual payload removed from the loading site.

A check must be included to preclude the possibility of multiple recordings of a single load. For example, if the haul route includes multiple extended stops and roading periods, then it is possible that after each of the multiple roadings the program would attempt to record the total payload as separate complete loading cycles. This possibility is negated by use of the "PAYLOAD CHANGE FLAG". If the flag has not been set, then control transfers to the beginning of WEIGH2 TSK and the load is not recorded. The flag is set, as discussed earlier, in response to the payload increasing by a tolerance roughly equivalent to one bucket load of material and reset after the first roading operation of that particular loading cycle. Subsequent roading operations will not result in the payload being recorded unless the payload has increased significantly and set the "PAYLOAD CHANGE FLAG". If a roading operation is detected and the flag is set, then the "INITIAL PAYLOAD" and "INITIAL VALID PAYLOAD" variables are updated, "LOAD#", strut pressures, and total payload are stored in EEPROM, and the "PAYLOAD CHANGE FLAG" is cleared. This information can be recalled at the end of a shift to provide an indication of the quantity of material removed from the work site and the productivity of a particular truck.

INDUSTRIAL APPLICABILITY

In the overall operation of the apparatus 10, assume that the off-highway truck 14 is positioned at a loading site prepared to receive a series of bucket loads of material from a loader vehicle. The payload monitor has previously been calibrated and is currently indicating that the load has not increased. As the first bucket load of material is dumped into the dump body 24 of the truck 14, the pressures in the front and rear struts 16,18 begin to oscillate as the frame 22 is displaced relative to the ground engaging portion 32. Simultaneously, the microprocessor 72 receives the signals from the pressure sensors 54,56,58,60 at 100 msec intervals and computes instantaneous payloads based on the magnitudes of these signals. Each instantaneous payload is compared to the previous payload computation and rejected as a valid payload signal because it differs from the previous payload by more than the preselected tolerance. This process is repeated until the damping effect of the struts 16,18 causes the pressure fluctuations to cease and the truck 14 stabilizes. After the truck 14 has been in the stable pressure condition for at least 5 seconds, then the computed total payload is stored as an actual indication of truck payload. Further, bucket loads of material result in the actual truck payload being updated after each 5 second period of stability. However, the payload monitor will not record the actual truck payload as an indication of a completed loading cycle until an extended period of strut pressure instability is detected. For example, after the loading cycle is completed, the operator of the truck 14 will normally transport the completed load to a dump site. In the course of roading the vehicle, the strut pressure signals will vary in magnitude relative to the rugosity of the road surface. Therefore, the payload monitor assumes that a 30 second period of unstable pressure signals is indicative of roading the truck to a dump site and thus the last valid payload must be a complete load.

Other aspects, objects, and advantages of this invention can be obtained from a study of the drawings, the disclosure, and the appended claims.

We claim:

1. An apparatus for measuring and indicating the weight of a payload carried by a work vehicle, the work vehicle having at least one front and rear strut disposed in supporting relation to a load carrying portion of the work vehicle, said apparatus comprising:

means for separately sensing the pressures of said front and rear struts and delivering signals respectively responsive to the magnitude of said front and rear strut pressures;

means for modifying said front and rear strut pressure signals by applying respective unique correction factors thereto, summing the resultant modified signals, and delivering a control signal responsive to the magnitude of the sum of said modified signals;

means for receiving said control signal and delivering an indication of the magnitude of the work vehicle payload in response to the magnitude of said control signal; and means for recording the magnitude of the control signal as an indication of actual current payload in response to the magnitude of said control signal changing by less than a preselected magnitude during a first preselected duration of time.

2. The apparatus, as set forth in claim 1, wherein said indicating means has a first means for delivering a first signal in response to the magnitude of said control signal being greater than a first preselected magnitude.

3. The apparatus, as set forth in claim 2, wherein said indicating means has a second means for delivering a second signal in response to the magnitude of said control signal being greater than a second preselected magnitude.

4. The apparatus, as set forth in claim 1, wherein said work vehicle includes a ground engaging portion and suspension means for supporting said load carrying portion in a manner to provide damped oscillatory motion between said ground engaging portion and said load carrying portion; and said correction factor of said rear pressure signal being a function of said suspension means.

5. The apparatus, as set forth in claim 4, wherein:

said load carrying portion includes a vehicular frame;

said suspension means includes a rear axle housing and an A-frame moment arm, said A-frame moment arm has a first end portion pivotally connected to said vehicular frame and a second end portion fixedly connected to said rear axle housing;

said rear strut has a first end portion pivotally connected to said vehicular frame and a second end portion pivotally connected to the second end portion of said A-frame moment arm; and said rear strut pressure correction factor is a function of the length of said A-frame moment arm and the horizontal distance between the center of said rear axle housing and the first end portion of said A-frame moment arm.

6. The apparatus, as set forth in claim 5, wherein said rear strut pressure coefficient is the distance between the first end portion pivot point of the A-frame moment arm and the second end portion pivot point of the A-frame moment arm divided by the horizontal distance between the center of said rear axle housing and the first end portion of said A-frame moment arm.

7. The apparatus, as set forth in claim 1, including means for storing the magnitude of the actual current payload as a completed loading cycle in response to the absence of said control signal being recorded as an actual indication of current payload for a second preselected duration of time.

8. The apparatus, as set forth in claim 7, wherein said second preselected duration of time is significantly longer than said first preselected duration of time.

9. An apparatus for measuring and indicating the weight of a payload carried by a work vehicle, the work vehicle having a frame, a rear axle housing, at least one front and rear strut, and an A-frame moment arm, said A-frame moment arm having a first end portion pivotally connected to said frame and a second end portion fixedly connected to said rear axle housing, said rear strut having a first end portion pivotally connected to said frame and a second end portion pivotally connected to the second end portion of said A-frame moment arm, said apparatus comprising:

means for separately sensing the pressures of said front and rear struts and delivering signals respectively responsive to the magnitude of said front and rear strut pressures;

means for modifying said front and rear strut pressure signals by separate preselected unique correction factors, summing the resultant modified signals, and delivering a control signal responsive to the magnitude of the sum of said modified signals;

said rear strut pressure correction factor being a function of the length of said A-frame moment arm and the horizontal distance between the center of said rear axle housing and the first end portion of said A-frame moment arm; and means for receiving said control signal and delivering an indication of the magnitude of the work vehicle payload in response to the magnitude of said control signal.

10. The apparatus, as set forth in claim 9, wherein said rear strut pressure correction factor is the distance between the first end portion pivot point of the A-frame moment arm and the second end portion pivot point of the A-frame moment arm divided by the horizontal distance between the center of said rear axle housing and the first end portion of said A-frame moment arm.

11. The apparatus, as set forth in claim 9, including means for recording the magnitude of the control signal as an indication of actual current payload in response to the magnitude of said control signal changing by less than a preselected magnitude during a first preselected duration of time.

12. The apparatus, as set forth in claim 11, including means for storing the magnitude of the actual current payload as a completed loading cycle in response to the absence of said control signal being recorded as an actual indication of current payload for a second preselected duration of time.

13. The apparatus, as set forth in claim 12, wherein said second preselected duration of time is significantly longer than said first preselected duration of time.

* * * * *